Patented Dec. 16, 1930

1,784,840

UNITED STATES PATENT OFFICE

GUY S. LA FORGE, OF UNION BRIDGE, MARYLAND

PROCESS FOR MANUFACTURING PORTLAND CEMENT

No Drawing.   Application filed July 23, 1929.   Serial No. 380,462.

This invention relates to the manufacture of Portland cement and has special reference to an improved mixture and process for making such cement.

In the manufacture of Portland cement as ordinarily practiced a mixture of limestone and shale, or other calcareous and argillaceous materials, is made and this mixture ground in any of the commonly used pulverizing mills. After the mixture is pulverized it is charged into a suitable calcining furnace which is usually in the form of a long tube or kiln set at a slight incline and rotated during the calcining operation. The mixture is fed into the upper end of the kiln and, due to the incline and the rotation, passes slowly down to and out of the lower end, being subjected in its passage to intense calcining heat such as may be obtained from the flames of burning pulverized coal, of oil or of gas admitted to the lower end.

In this process the step of pulverizing is very important since, for effective calcination, the materials must be ground to a condition of great fineness and there must be no large particles in the mixture as fed into the kiln. To accomplish this by the usual milling process requires much time and adds greatly to the expense.

One important object of the present invention is to provide an improved process by which the step of pulverizing to the desired and essential fineness may be greatly expedited.

A second important object of the invention is to provide an improved mixture for feeding into the pulverizer or mill which will greatly assist the pulverizing operation but which will in no way be deleterious to the final product or affect the calcination in the kiln, the improved mixture when pulverized and treated in the kiln expediting the calcination and improving the resultant product.

With the above and other objects in view the invention consists in general of an improved process of producing Portland cement and an improved mixture therefor as will now be particularly described and specifically claimed.

In the manufacture of Portland cement the product drawn from the kiln is in the form of a very hard clinker. In this process the usual mixture of limestone and shale or other calcareous and argillaceous material has added thereto before pulverizing from 10% to 50% of Portland cement clinker in its unground state. The resultant mixture is then passed through a suitable pulverizing mill and the hard but friable clinker will act on the other materials to greatly assist the action of the mill and rapidly reduce the whole mass to the finely pulverized state necessary for proper calcination of the lime and clay in the kiln. This mixture is then fed into the kiln and the calcination will be greatly expedited as the already calcined clinker content acts to somewhat separate the unclinkered particles so that the chemical union of the materials is much hastened. The entire charge is then drawn from the kiln and treated in the usual manner, that is, ground and packed.

Thus the process and mixture effect an improvement in the rapidity of production with a consequent lowering of the cost.

Having thus described the invention, what is claimed as new, is:

1. Those steps in the process of producing Portland cement which consist in mixing together raw calcareous material, raw argillaceous material and unground Portland cement clinker, and subjecting the mixed materials to a pulverizing operation.

2. Those steps in the process of producing Portland cement which consist in mixing together raw calcareous material, raw argillaceous material and unground Portland cement clinker, subjecting the mixed materials to a pulverizing operation, and subjecting the pulverized mass to a calcining operation.

In testimony whereof I affix my signature.

GUY S. LA FORGE.